United States Patent
Sugiura et al.

[11] 3,951,428
[45] Apr. 20, 1976

[54] GAS BAG INFLATING DEVICE

[75] Inventors: Fumio Sugiura, Aichi; Mitsuhiko Ura, Toyota, both of Japan

[73] Assignee: Toyota Jidosha Kogyo Kabushiki Kaisha, Toyota, Japan

[22] Filed: Mar. 6, 1974

[21] Appl. No.: 448,563

[30] Foreign Application Priority Data
Mar. 27, 1973 Japan............................. 48-37897

[52] U.S. Cl................................. 280/737; 137/68 A
[51] Int. Cl.²........................................ B60R 21/10
[58] Field of Search............... 102/39; 23/281; 280/150 AB; 137/68; 222/3, 5

[56] References Cited
UNITED STATES PATENTS

| | | | |
|---|---|---|---|
| 2,309,978 | 2/1943 | Pratt | 102/39 |
| 3,117,424 | 1/1964 | Hebenstreit | 222/3 |
| 3,238,067 | 3/1966 | Brooks | 23/281 X |
| 3,450,414 | 6/1969 | Kobori | 280/150 AB |
| 3,674,059 | 7/1972 | Stephenson | 280/150 AB X |
| 3,788,667 | 1/1974 | Vancil | 137/68 X |

*Primary Examiner*—Martin P. Schwadron
*Assistant Examiner*—Richard Gerard
*Attorney, Agent, or Firm*—Stevens, Davis, Miller & Mosher

[57] ABSTRACT

A device for inflating a gas bag comprising an end member or socket member which is airtightly disposed at one end of a gas bomb, and a gas generating device which is detachably disposed in the end member or socket member. The end member or socket member includes a seal plate which hermetically isolates the interior of the end member or socket member and the interior of the gas bomb and which is broken upon actuation of the gas generating device. In filling the gas bomb with a high pressure gas for the initial inflation of the gas bag, the gas generating device is detached from the end member or socket member, so that the filling job can be safely carried out.

4 Claims, 5 Drawing Figures

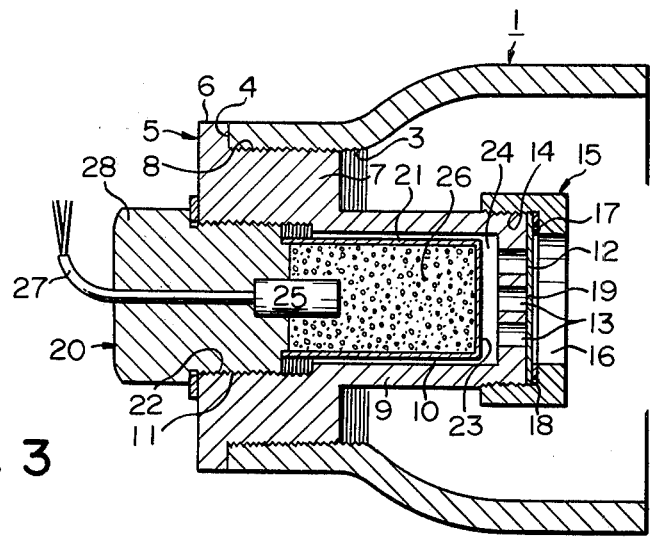
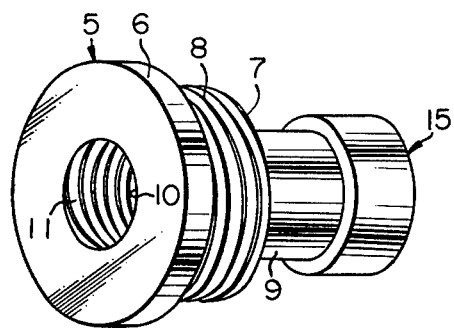
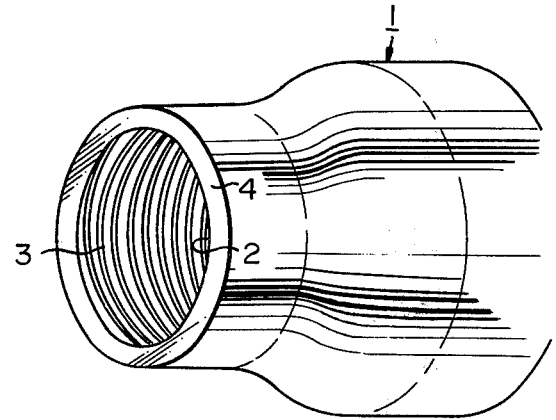
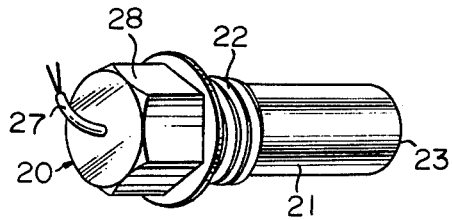

GAS BAG INFLATING DEVICE

The present invention relates to a gas bag inflating device which is equipped in a vehicle such as automobile and which, in case of a collision or the like, instantaneously inflates a gas bag so as to protect occupants from the secondary collision.

In a prior-art gas bag inflating device of this type, a vessel containing an ignition device as well as a gas generating agent is always subject at its whole peripheral surface to the pressure of a high pressure gas within a gas bomb. The gas bomb is filled with the high pressure gas under the state under which a gas generating device is attached, so that the filling job is attended with danger. The gas bomb itself is transported and stored with the device exposed to the high pressure, so that there is the danger of destruction of the vessel etc. Where the ignition device or the gas generating agent is to be exchanged or repaired, the high pressure gas within the gas bomb need be once let out fully, and the handling is dangerous.

An object of the present invention is to provide a gas bag inflating device in which a mounting hole or cavity for receiving a gas generating device and a gas bomb are hermetically sealed so as to perfectly isolate the interior of the mounting hole or cavity and the interior of the gas bomb and to make them non-communicating, whereby when the gas bomb is to be filled with a high pressure gas or when it is to be transported or stored, the gas generating device can be detached from an end member or socket member, and the safety is thus enhanced remarkably.

Another object of the present invention is to provide a gas bag inflating device in which when the gas generating device is to be detached from the end member or socket member for the purpose of maintenance and management, it can be securely and speedily detached without the necessity for the operation of fully letting out the high pressure gas within the gas bomb as in the prior-art device.

Still another object of the present invention is to provide a gas bag inflating device in which the gas generating device is made a detachable cartridge mechanism, and it can be separately fabricated.

These and other objects of the invention will be seen by reference to the description taken in connection with the accompanying drawing, in which:

FIG. 1 is a front view, partially in vertical section, showing the state in which the principal members of a gas bag inflating device according to the present invention are assembled on an opening portion at the front end of a gas bomb, FIGS. 2 to 4 illustrate the state in which the various members are detached, wherein:

FIG. 2 is a perspective view showing a part of the opening portion at the front end of the gas bomb;

FIG. 3 is a perspective view of an end member or socket member to be mounted on the front end opening portion of the gas bomb; and FIG. 4 is a perspective view of a gas generating device to be mounted on the end member or socket member.

Figure 5:
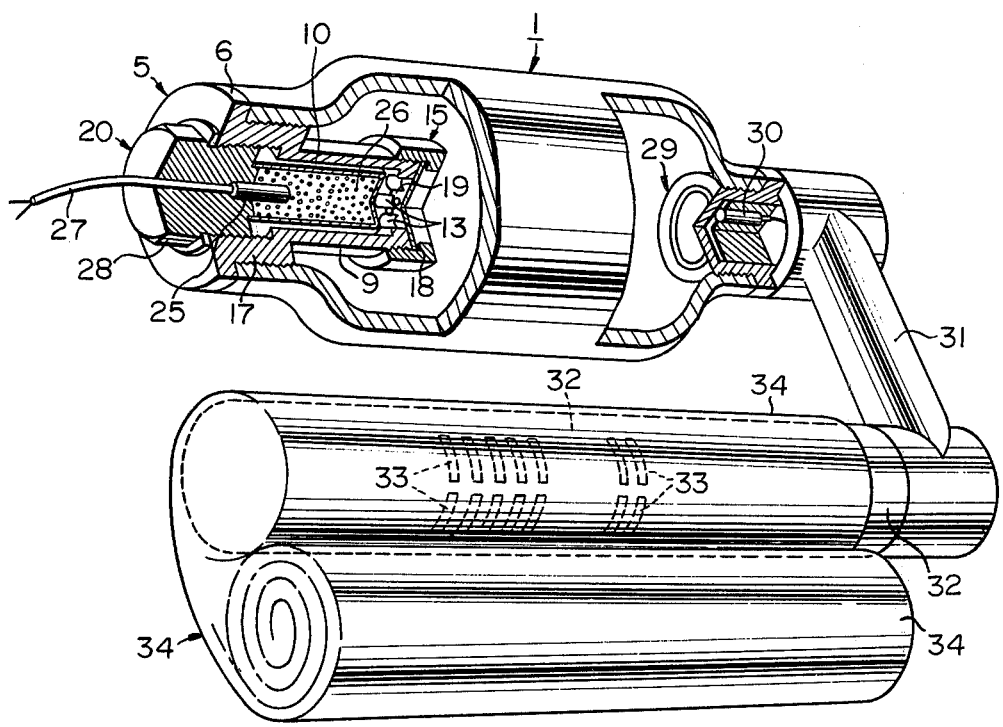
FIG. 5 is a perspective view, partially broken away, showing the state in which a gas bag is coupled to the device of the present invention.

In an embodiment shown in FIGS. 1 to 4, a gas bomb or high pressure gas container 1 has a gas release valve to a gas bag at one end and an opening portion 2 at the other end. At the inner periphery of the opening portion 2, a thread portion 3 is formed. An end member or socket member 5 for airtightly sealing the opening portion 2 is screwed into and secured to the thread portion 3.

The end member or socket member 5 is constructed of a flange portion 6 which is to be held in contact with the end face 4 of the opening portion 2 of the gas bomb 1;

a large-diameter portion 7 which is slightly smaller in diameter than the flange portion 6 and which is formed at its outer periphery with an external thread portion 8 to be engaged with the thread portion 3;

a small-diameter portion 9 which is formed concentrically with the large-diameter and which has a suitable length;

a mounting hole or cavity 10 which is provided from the flange portion 6 towards the small-diameter portion 9 and which is for a gas generating device 20 to be described later; and a bottom plate portion 12 which is the bottom part of the mounting hole or cavity 10.

At the inner periphery of the opening part of the mounting hole or cavity 10, a thread portion 11 is formed. In the bottom plate portion 12, a plurality of communication apertures or orifices 13, 13 each having a previously designed diameter are provided in a manner to be parallel along the axis of the end member or socket member 5.

At the outer periphery of the rear end of the small-diameter portion 9, there is formed a thread portion 14, on which a cap 15 provided with a window 16 of a predetermined diameter is fittedly secured. Between the inner surface portion 17 of the cap 15 and the bottom plate portion 12 of the small-diameter portion 9, a seal plate 19 is fixed in close contact through the medium of a hermetically sealing and holding member 18. The seal plate 19 serves to perfectly cut off the communication between the interior of the mounting hole or cavity 10 as corresponds to the small-diameter portion and the interior of the gas bomb 1.

On the other hand, the gas generating device 20 is detachably disposed in the mounting hole or cavity 10 of the end member or socket member 5 in such manner that a thread portion 22 formed at the outer periphery of the base part of the device 20 is engaged with the thread portion 11 of the mounting hole or cavity 10. The gas generating device 20 is so constructed that an ignition device 25 and a gas generating agent 26 are housed in a receiving case 21 fabricated of, for example, carbon steel.

The rear end face 23 of the receiving case 21 of the gas generating device 20 is so made as to define some interspace between it and the inner surface of the bottom plate portion 12 having the foregoing orifices 13, 13. The interspace is made a combustion chamber 24 of the gas generating device 20.

The gas generating agent 26 within the receiving case 21 opposes to the combustion chamber 24.

Reference numeral 27 denotes electric wires for actuating the ignition device 25 housed in the receiving case 21. Shown at 28 is a holder for a tool as is formed in order to mount the gas generating device 20 into the end member or socket member 5.

At the one end of the gas bomb 1, the gas release valve (29 in FIG. 5) for releasing a gas to the gas bag is provided. The valve 29 is blasted and opened by means of a detonator (30 in FIG. 5).

In the gas bomb 1, a high pressure gas for the initial inflation of the gas bag is filled beforehand. The seal plate 19 has such a strength that although it is not destroyed by the gas pressure of the high pressure gas previously filled in the gas bomb 1, it can be destroyed by the gas pressure of a high pressure gas produced from the gas generating agent 26 upon the actuation of the gas generating device 20.

In the embodiment, the ignition device 25 and the gas generating agent 26 are made the cartridge type in which they are housed in the receiving case 21. This construction, however, is not restrictive. The gas generating agent 26 may be made a solid body of cylindrical shape which is formed with a plurality of penetrating holes in the axial direction thereof. Alternatively, it is also allowed to form the gas generating agent 26 into tablets of suitable size beforehand and to charge the mounting hole or cavity 10 of the end member or socket member 5 with the tablets directly without employing the receiving case 21. The gas generating agent formed as the solid body can of course be variously changed in the direction of the penetrating holes, the magnitude of the diameter etc. by considering the combustion efficiency.

FIG. 5 is a perspective view showing the state in which the gas bag for reliably and quickly protecting occupants from the secondary collision at a head-on or rear-end collision between vehicles or at a collision of a vehicle with any other object, and the gas bag inflating device of the present invention are attached into a continuous form.

In the figure, numerals 31 and 32 designate gas supply pipes, 33 a number of gas ports which are provided at suitable positions on the outer peripheral surface of the gas supply pipe 32, and 34 the gas bag which is secured with its end part covering the gas supply pipe 32. The gas bag 34 is housed and arranged in a predetermined box in the state in which it is folded up or rolled in into a suitable shape. Such structures are not greatly different from those of the prior-art gas bag inflating device.

The gas bag inflating device according to the present invention is constructed as stated above. The end member or socket member 5 with the seal plate 19 attached thereto is previously secured in the opening portion 2. Thereafter, the high pressure gas is filled into the gas bomb 1. Subsequently, the gas generating device 20 is secured and disposed by bringing the thread portion 22 of the gas generating device 20 into engagement with the thread portion 11 formed at the inner periphery of the opening of the mounting hole or cavity 10 of the end member or socket member 5. Even in the state in which the gas generating device 20 is mounted, the interior of the combustion chamber 24 of the mounting hole or cavity 10 is maintained at the atmospheric pressure.

Under this state, the gas bag inflating device is equipped in the vehicle. At the collision of the vehicle with another vehicle or any other object, the detonator 30 for opening the valve as is disposed for the gas release valve 29 in the gas bomb 1 gives rise to explosion by, for example, an electric signal.

Owing to the explosion, the valve 29 is opened. In consequence, the high pressure gas in the gas bomb 1 passes through the valve 29, advances within the gas supply pipe 31 and gets to the gas supply pipe 32. Then, it is injected into the gas bag 34 through the multiplicity of gas ports 33 formed in the outer peripheral surface of the supply pipe 32.

Simultaneously with the opening of the valve 29 or after some time lag over the same, the ignition device 25 housed in the gas generating device 20 is actuated by, for example, an electric signal and ignites the gas generating agent 26 housed in the same receiving case 21 as for the ignition device 25.

The gas generating agent 26 having been ignited and having begun to burn produces a gas suddenly, and instantaneously brings into a high pressure state the interior of the combustion chamber 24 having been held at the atmospheric pressure. The receiving case 21 is broken mainly at the rear end face 23. The produced gas passes through the orifices 13, 13, and blows off the seal plate 19 into the gas bomb 1. It passes through the gas bomb 1, and instantaneously inflates the gas bag 34. It is thus made possible to reliably and easily protect the occupants in the car room from the secondary collision.

What is claimed is:

1. A gas bag inflating device comprising:
   a gas bomb;
   an inflatable gas bag connected to one end of said gas bomb;
   a normally closed release valve provided at said end of said gas bomb to control gas flow to said gas bag;
   a gas generating device including a gas generating agent, a casing for storing said gas generating agent and an ignition device for igniting said gas generating agent in said casing;
   a socket member detachably sealed to the other end of said gas bomb, said socket member defining a mounting cavity, said gas generating device being detachably connected to said socket member and disposed thereon to define a combustion chamber between said casing and the closed end of said socket member, and said closed end of said socket member defining a plurality of orifices; and
   a frangible seal plate of sufficient strength to withstand a predetermined gas pressure within said gas bomb and of insufficient strength to withstand a gas pressure resulting from the actuation of said gas generating device, said frangible seal plate being secured to and disposed on the exterior of said closed end of said socket member, whereby said frangible seal plate cuts off and hermetically seals said respective orifices from the inner side of said gas bomb and is subject on its outer surface to said predetermined gas pressure within said gas bomb, thereby to prevent the gas within said gas bomb from flowing into said socket member.

2. A gas bag inflating device according to claim 1, wherein said casing is made of a carbon steel sheet.

3. A gas bag inflating device according to claim 1, further comprising:
   a cap, having an aperture defined therethrough, releasably secured to and fitted over the closed end of the socket member, and said frangible seal plate is positioned between said cap and the closed end of the socket member.

4. The gas bag inflating device according to claim 1, wherein said gas generating device is made a cartridge type in which said ignition device and said gas generating agent are housed in a receiving case.

* * * * *